May 6, 1941. J. W. BRYCE 2,240,544
READING MACHINE
Filed Oct. 27, 1936 6 Sheets-Sheet 2
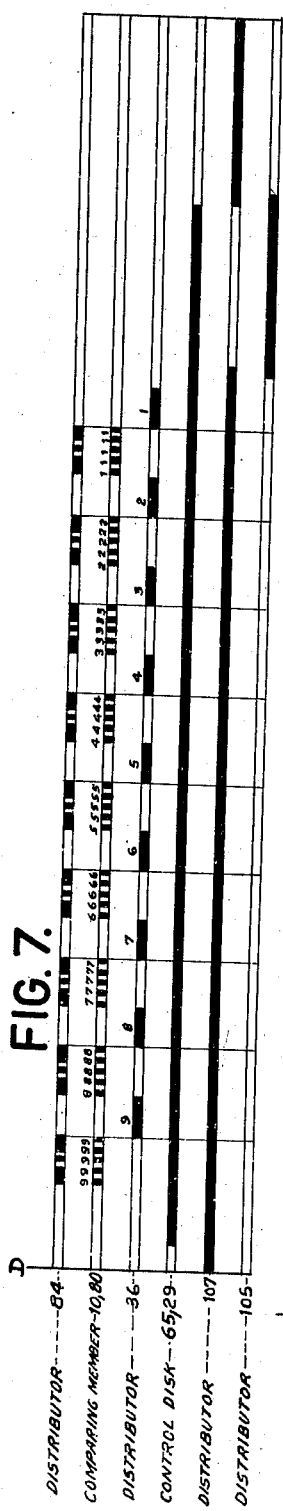
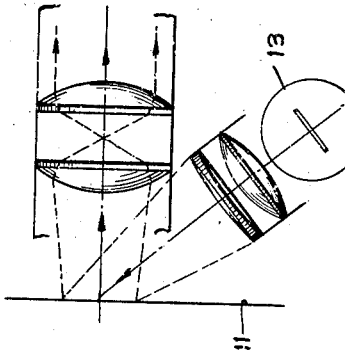
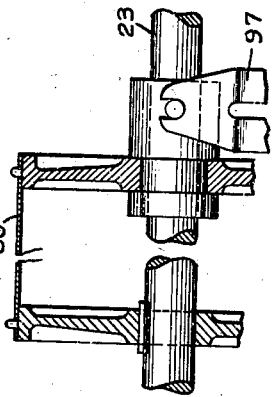
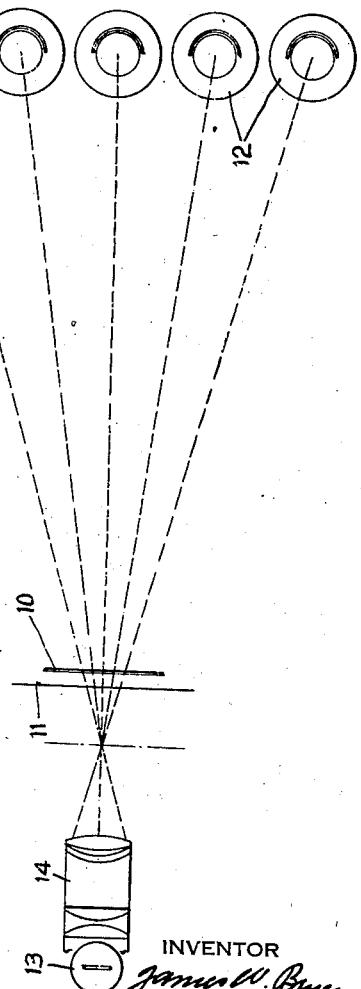
INVENTOR
James W. Bryce
BY
ATTORNEY May 6, 1941.  J. W. BRYCE  2,240,544
READING MACHINE
Filed Oct. 27, 1936   6 Sheets-Sheet 3

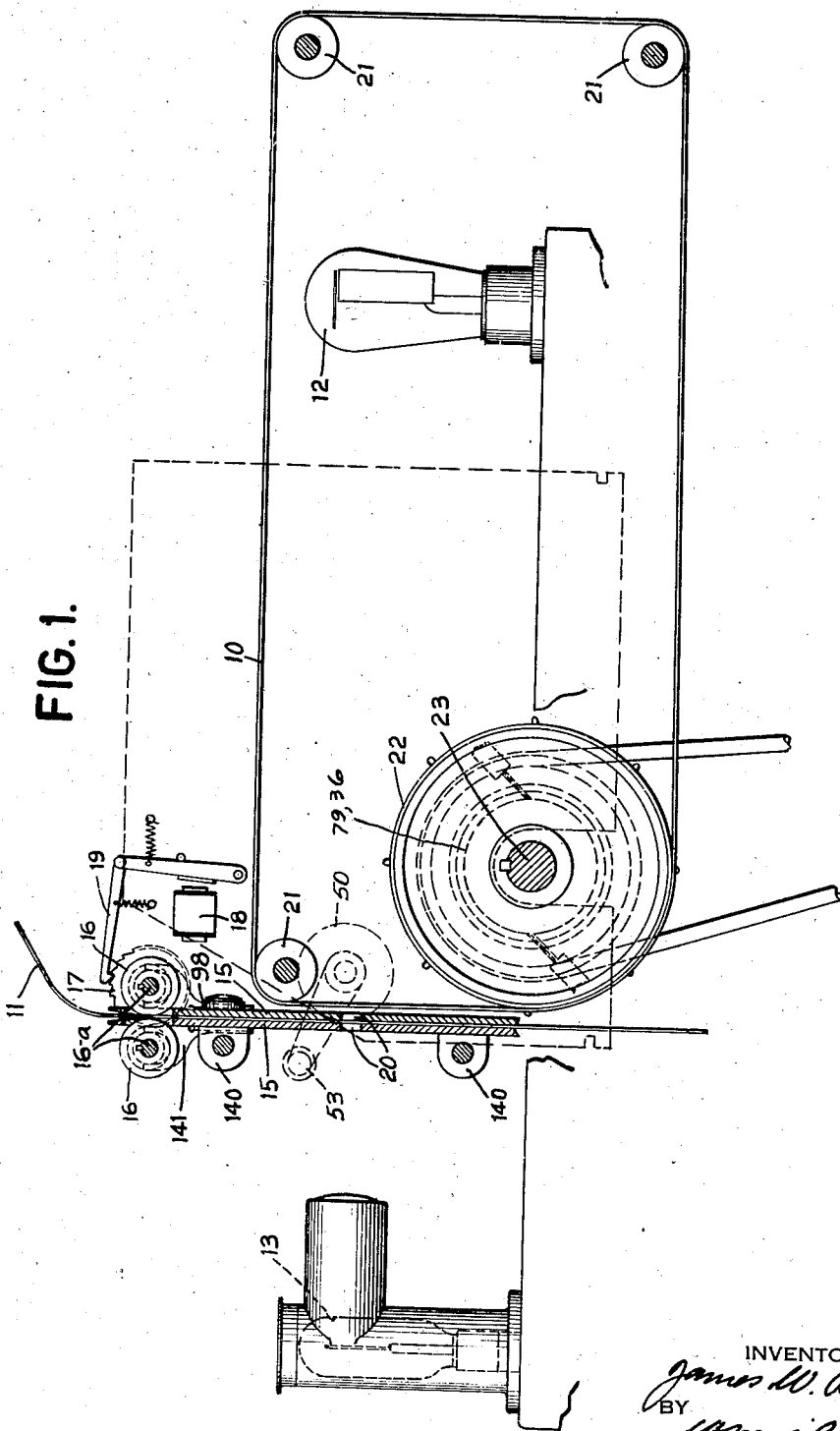

INVENTOR
James W. Bryce
BY
ATTORNEY

May 6, 1941. J. W. BRYCE 2,240,544
READING MACHINE
Filed Oct. 27, 1936 6 Sheets-Sheet 4

INVENTOR
James W. Bryce
BY
ATTORNEY

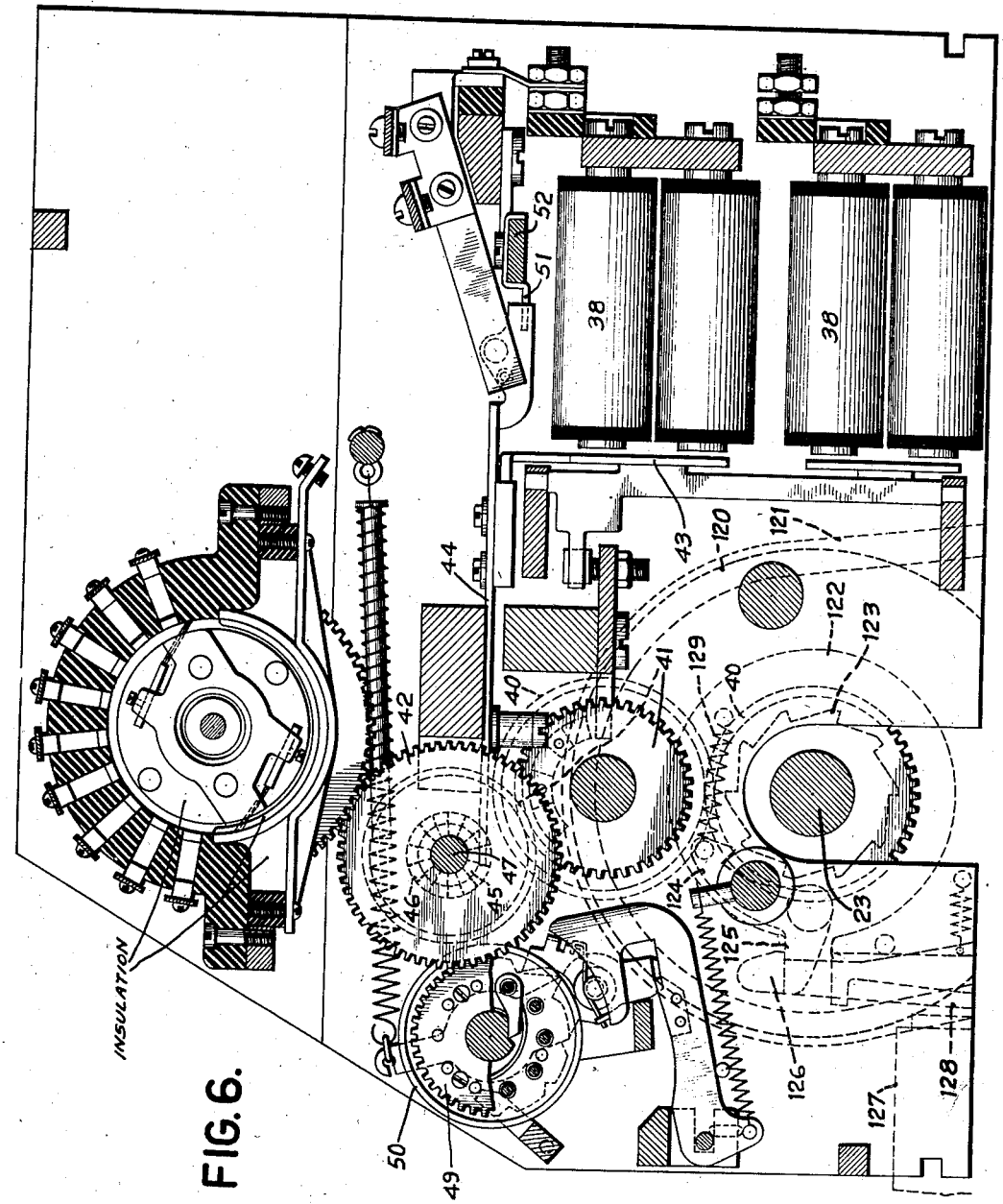

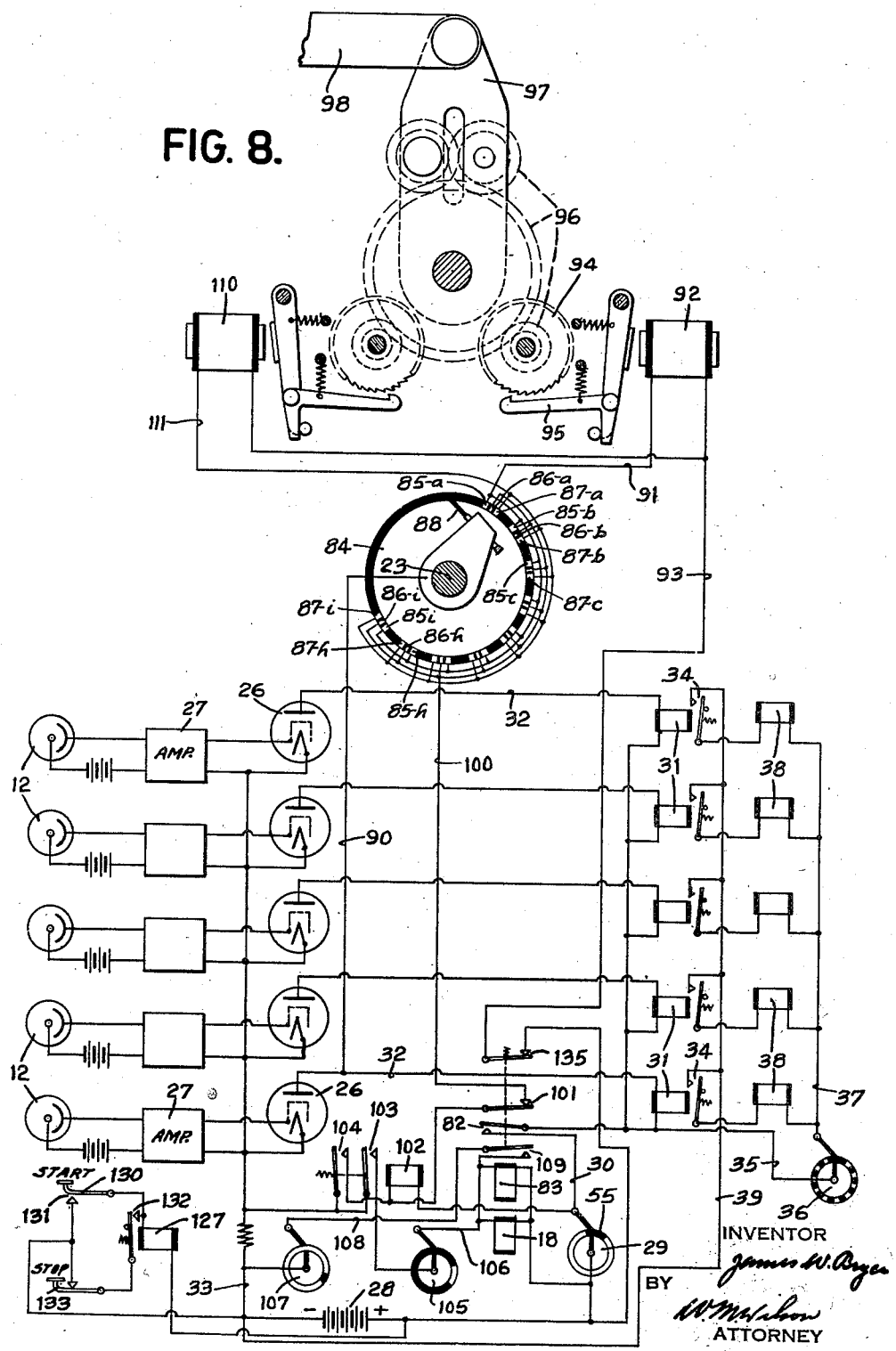

Patented May 6, 1941

2,240,544

UNITED STATES PATENT OFFICE 2,240,544

READING MACHINE

James W. Bryce, Glen Ridge, N. J., assignor to International Business Machines Corporation, New York, N. Y., a corporation of New York Application October 27, 1936, Serial No. 107,819

11 Claims. (Cl. 235—61.11)

This invention relates to reading character or indicia representations directly and converting such data to current variations or indications for controlling purposes.

More specifically the invention embodies and relates to means for reading printed or formed characters by light sensitive devices and a provision for compensating means while reading the characters in the event that the said characters are not in perfect alinement or properly positioned on the character record retaining means.

The present invention will be disclosed in certain preferred embodiments to illustrate the general principle thereof, whereby printed matter or data prepared by standard typing, printing, or similar machines are read or scanned by light sensitive means, such as photocells, transforming the printed data to current values or indications to control certain types of translating, registering, or indicating machines or devices. Broadly, the type of system just mentioned is well known at present and a common method of effecting this result is to compare the characters of the record sheet with a comparing character mask or member until complete agreement of the characters is indicated; however, it has been found that when standard or the usual printed or formed matter or data is to be read by most of the systems proposed and which are known by those skilled in the art, that such known systems are impractical and of small value owing to the fact that compensating means for misalinement of the characters is not provided. It is well known that the graphical characters printed, for example, by the usual typewriting or printing devices are not all formed or allocated in the same plane, for example, or that the spacing thereof may be irregular and varying, or, in other words, the characters are irregularly disposed on the record sheet. In forming record sheets, there is no assurance that the spacing of the characters will be perfectly regular and that the position of the characters will always be in perfect alinement vertically and horizontally. Unless the characters on the record sheet are formed accurately and perfectly, that is, properly alined and spaced equally (regularly disposed thereon), the present known reading devices would be inoperative due to the lack of compensating means for incorrect alinement of characters.

It is an object of the present invention to provide an improved reading machine and one including compensating means in such character reading systems whereby indications or characters formed but not perfectly aligned or spaced may be read instantaneously, irrespective of the disposition of the characters on the record medium, to control associated indicating or manifesting devices. The system embodied in the present invention broadly and briefly comprises a scanning device to compare the characters of the record sheet with the characters of a comparing member. The comparing member has disposed thereon the characters to be compared. In addition thereto, a plurality of similar characters are disposed thereon which are slightly offset in a predetermined plane or in different planes, if desired. For illustrative purposes, the characters of the comparing member are offset in one direction and the comparing member is adapted to be rotatable, in this manner effecting alinement of the character to be read in both the horizontal and vertical planes. The rotary comparing member is interposed between the record sheet and radiant energy responsive devices, such as photocells, so that upon agreement of the characters of the record sheet and comparing member, the photocells are arranged to be operated to indicate such as condition. Thus, reading means are provided for reading the characters formed on a record sheet to determine the true character significance thereof, the said reading means including the combination; of means including light responsive means for examining by light rays the character positions on the sheet, of identifying means having means capable of identifying all the characters which are regularly and irregularly disposed on the sheet, such as the comparing member bearing the plurality of groups of comparing characters, and of means for causing the identifying means to co-operate with the light responsive means by providing relative movement between the characters to be read and the comparing characters for comparing the characters on the member with each character to be read, and effecting modification of the light rays, upon comparison of like characters before reaching the light responsive means. In the preferred embodiment, certain features in the reading system proper, apart from the compensating device, are included which are deemed an important improvement over the present known systems. Upon operation of the photocells, electronic devices are energized to control associated mechanisms. In accordance with the present invention, it is preferred to employ an electronic device such as an electrical discharge tube of a type in which the discharge is started by a momentary application of a signal condition thereto, the discharge continuing independently of the applied signal condition until interrupted by an associated control means. In one form the electrical discharge tube may comprise a gas discharge path which is electro-statically controlled.

A convenient form of discharge tube for this system may comprise a gas filled thermionic tube of such construction that when the anode is connected to positive battery and a certain potential is applied to the grid, the tube will be activated and current will flow from the anode to the cathode. As soon as the plate current begins to flow, the grid is instantly surrounded by a sheath of positive ions and has no further effect in controlling the plate circuit. Hence, removal of the grid potential will not stop the plate current, once it is started, but it can readily be stopped by removing the plate voltage. The function of the grid may, therefore, be likened to a trigger. The amount of power required to start the tube is exceedingly small. A form of the thermionic tube having the characteristics described is disclosed in the Langmuir Patent No. 1,289,823.

It was mentioned that the operations of the photocells are adapted to trigger the electronic devices, one form a type of discharge tube just described. Operation of the tubes causes the associated apparatus, such as relay or control devices, to be operated until the anode circuit of the discharge tube is opened. Several methods of application will be disclosed to show the many possible embodiments of the present invention. An embodiment is shown in the well known tabulating machines, and another embodiment to show the application to typewriters, adding machines, and like devices, which have control elements which may be controlled by associated control magnets.

Another feature of the present invention is the provision of means whereby lines of various character designations irregularly disposed on the record medium may be read or scanned to effect control of the associated apparatus in accordance with the character designations read.

The left hand margins of the lines of character designations may be misalined so as to be offset in an irregular manner and provision is made to aline the record medium and the reading means to effect proper reading of the character designations.

Various other objects and advantages of the invention will be obvious from the following particular description of one form of mechanism embodying the invention or from an inspection of the accompanying drawings; and the invention also constitutes certain new and useful features of construction and combination of parts hereinafter set forth and claimed.

In the drawings:

Fig. 1 is a section of the reading machine.

Figs. 2 and 2A show the electro-optical analyzing devices.

Fig. 6 is a vertical section through the accumulator of a well known statistical machine and the main driving elements.

Fig. 7 is a timing chart as applied in the present invention.

Fig. 8 is a circuit diagram showing diagrammatically one form of a modification of the present invention.

Fig. 10 is a fragmentary view of the comparing member positioning element.

Figures 3, 4:
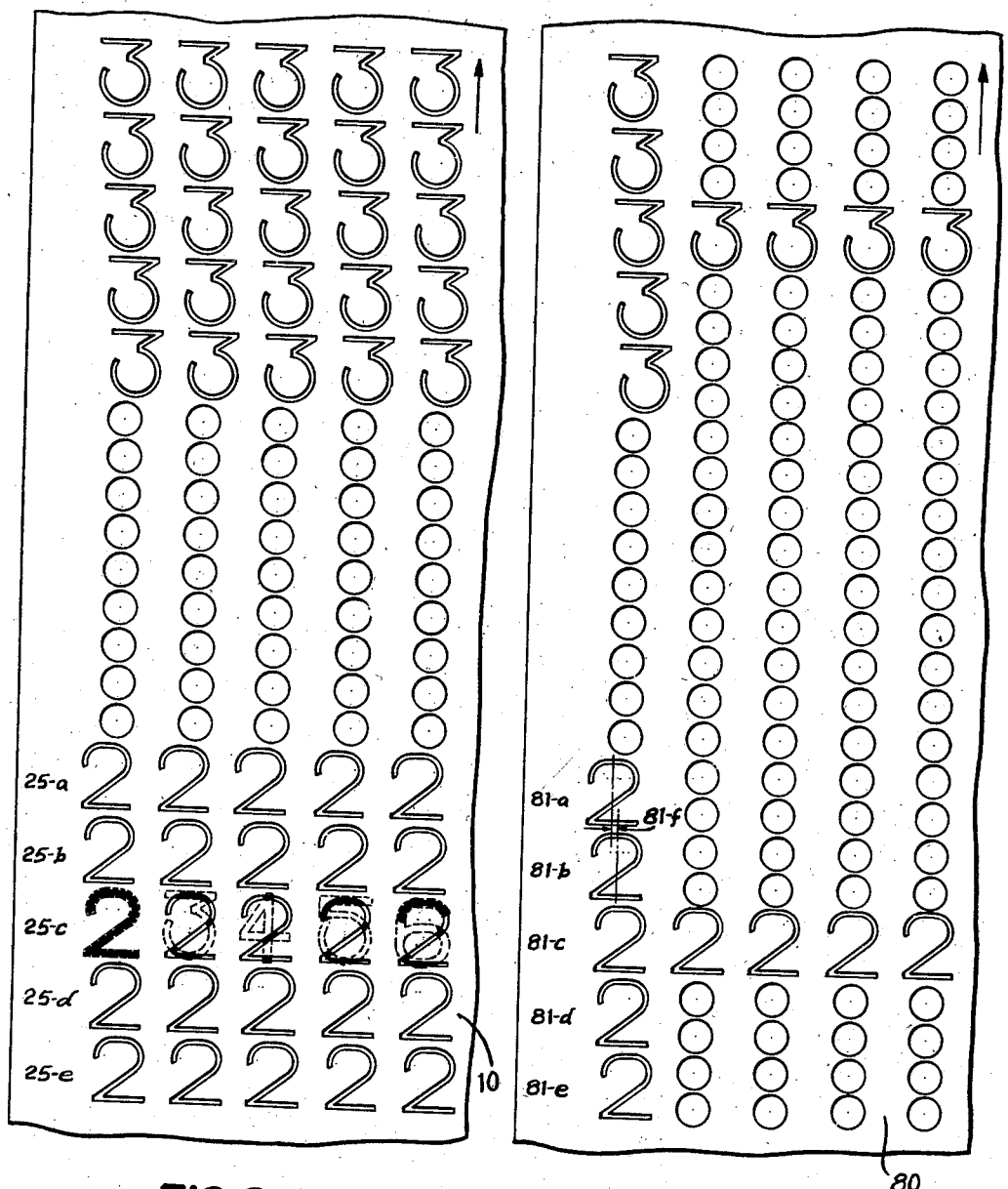
Figs. 3 and 4 are fragmentary views of the comparing members.

Referring now to Figs. 1, 2, and 3, a comparing member or mask 10 is shown interposed between a record sheet 11 and a group of photocells 12 so that a light source 13 is adapted by means of the condenser system 14 to illuminate the record sheet and mask 10 whereupon the light rays impinge upon the photocells 12. The number of photocells employed corresponds to the number of columns desired to be read upon the record sheet. The mask as shown, particularly in Fig. 3, comprises a plurality of orders of characters consisting of groups containing a plurality of similar characters; however, in each group the similar characters are slightly offset from one another, the purpose of which will be understood as the description progresses.

One method of presenting the various characters disposed on the comparing member or mask 10 to a sensing position is shown in Fig. 1. The light source 13 and photocells 12 are mounted on suitable bases and disposed so that the record sheet 11 and comparing member 10 are interposed therebetween. The record sheet 11 is positioned between the guide plates 15 and fed therethrough by the rollers 16 secured to rods 16—a and one of which rods is rotated step by step by a ratchet wheel 17 controlled by the paper feed magnet 18 and pawl 19, so that upon the energization and deenergization of the magnet 18, the record sheet is fed a distance equivalent to the spacing between the lines thereon. A sensing position 20 is provided and is shown in the form of openings in the guide plates 15.

The mask or comparing member 10 is shown in the form of an endless record member supported by idler rollers 21 and held in position and fed by the sprocket wheel 22 which is mounted on the main shaft 23 and rotated by any suitable means. Three complete revolutions of the shaft 23 and sprocket wheel 22 are required to position or present the complete comparing member one time to the scanning position or openings 20 in the guide plates. Thus, for one revolution of the comparing member, three lines of the record sheet may be scanned. Consequently, three complete sets of characters are provided on the comparing member. Referring to Fig. 3, several of the orders of part of the characters of a group in one of the three sets of characters are shown.

Five orders of groups of characters are shown for illustrative purposes. It is obvious that the number of orders can be increased or decreased as desired. Likewise, the number of similar characters shown in each group of characters is five for purposes of alinement; this number may be increased or decreased as seen fit. It is noted that the similar characters 25—a to e in one group of an order are staggered slightly vertically. The purpose of this arrangement is to provide a method of matching the characters of the comparing member with the characters on the record sheet even though the characters on the record sheet are not in perfect alinement or properly and regularly spaced. It is obvious that with this method of scanning, even though the characters on the record sheet are displaced or mis-alined in the horizontal line, it is possible to match the character thereon due to the arrangement of the offset characters on the comparing mask 10. It is evident, too, since the comparing member or mask 10 is adapted to be rotatable, and since the openings 20 in the guide plates 15 are slightly greater in proportion to the size of the characters to be read or scanned that the matching of characters displaced or misalined in a vertical line is effected. In Fig. 3, it is shown how the character "2" in one order is matched with one of the characters "2" of the group in corresponding order on the comparing mask. The character group on the record sheet to be read or compared is 23456. As the "3" group is presented to the scanning position 20, one of the five characters in the "3" group of that order will correspond perfectly with the character "3" on the record sheet, and similarly with the remaining characters in the other orders. When the characters on the comparing mask and the record sheet match or correspond, the minimum amount of light is permitted to be impinged on the corresponding order photocells 12.

In this description, of course, it is assumed that the record sheet is translucent and the characters thereon are opaque and that the characters on the comparing member are either transparent or merely openings in an opaque mask. It is obvious, of course, that this arrangement can be reversed; that is, the characters on the record sheet may be translucent and disposed on an opaque record sheet so as to fit in with the requirements of the system. It is also evident that reflected light may be used, that is, by reflecting various amounts of light according to the outline of the characters as shown in Fig. 2A. Therefore, continuing with the assumed example, when the characters are perfectly matched, the minimum amount of light is permitted to be impinged upon the corresponding order photocells 12 to operate the said cells.

Figure 5:
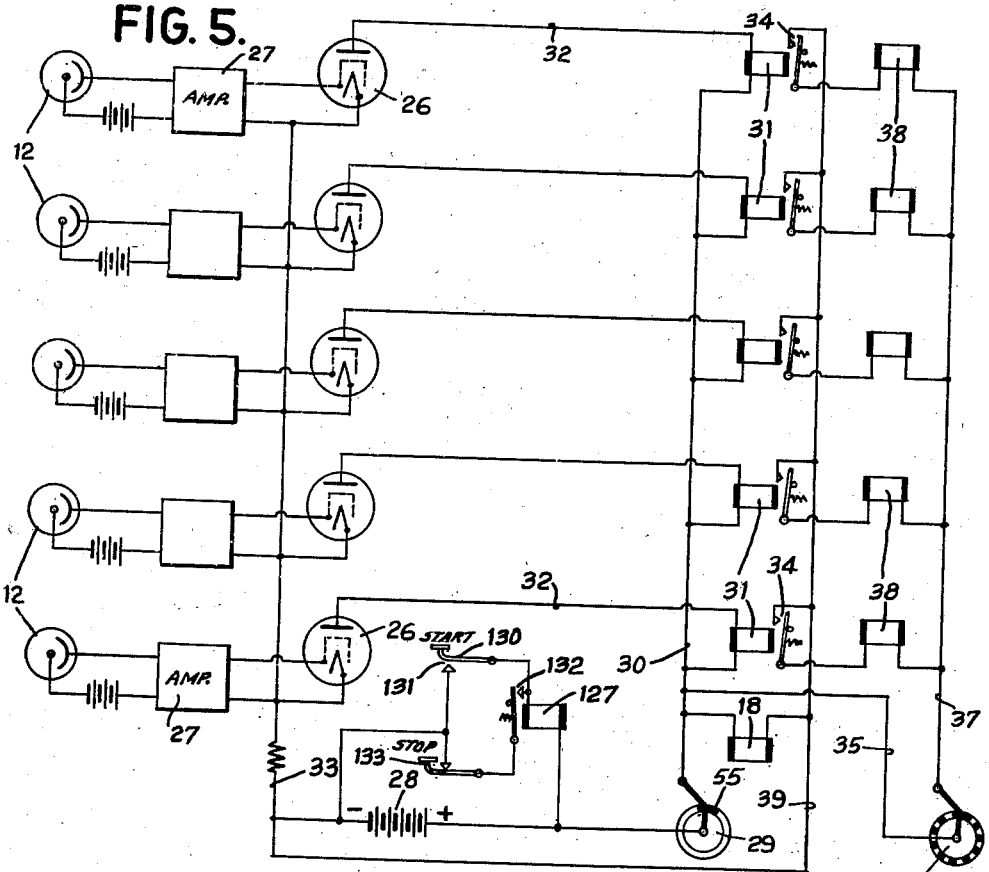
Fig. 5 is a circuit diagram showing one form of connections embodying the principles of the present invention and shown applied to a well known type of statistical machine.

Referring now to Fig. 5, the photocell and amplifier circuits are so arranged that when the minimum amount of light falls upon the photocell, the grid of the electrical discharge tube 26 of the type described hereinbefore is triggered to permit current to flow in the anode circuit thereof. These types of controlling circuits are well known and it is deemed not necessary to describe them further. To continue with the example, let it be assumed that the "2" character on the record sheet is matched with the "2" character on the comparing member to permit the minimum amount of light to fall upon the photocell to operate the corresponding photocell circuit and amplifier unit 27 to trigger the grid of the electric discharge tube 26 to permit current to flow in the plate circuit thereof which is as follows: the positive terminal of battery 28, control commutator 29 (the rotating member of which is secured to shaft 23), conductor 30, coil of relay 31, conductor 32, anode and cathode of discharge tube 26, conductor 33 to battery 28. Current flows in the circuit traced until the plate circuit is opened, irrespective of the duration of the grid condition of the tube.

Referring now to Fig. 7 representing a timing chart, it is seen that the thyratron control unit is closed practically the entire machine cycle, a complete cycle as represented is equivalent to a complete revolution of the main drive shaft 23; therefore, due to the current flow in the plate circuit just described, relay 31 is energized and remains energized until the control commutator 29 opens the said plate circuit.

Energization of relay 31 operates its associated contacts 34 to establish the following circuit: positive polarity of battery 28 to control commutator 29, conductors 30 and 35, impulse distributor 36 (the rotating member of which is secured to shaft 23), conductor 37, coil of relay 38, contacts 34 of relay 31 and conductor 39 to negative polarity of the battery, energizing relay or magnet 38. The energized relay or magnet 38 may represent any desired type of controlling element to control any suitable indicating or registering means representing the condition just described, namely, that the characters of the record sheet and the particular character of the comparing mask correspond. A particular type of controlled device will now be explained which may be used in the reading system described. The relay or magnet 38 represents, in the example to be set forth, the controlling element of a well known statistical machine. The application in this instance may be such that it is desired to enter an amount in an item entering means or accumulator corresponding to the character disposed on the record sheet and read by the described reading system.

Referring now to Fig. 6, the operation of the item entry means will be briefly described. This unit is well known in the art and requires no detailed description; for a detailed description reference may be made to Patent No. 1,976,617. Magnet 38 may be energized at various points in the cycle of the machine, depending upon the timed interval of the matching of the characters of the record sheet and comparing mask. Energization of the magnet 38 attracts the armature 43 to displace the attached lever 44 causing the latching member 45 slidably mounted on shaft 47 to engage the member 46 integral with gear 42 loosely mounted on shaft 47. Gear 42, when thus coupled to shaft 47, is rotated thereby due to the gearing thereto from the main shaft 23 and gears 40 and 41, and rotation of gear 42 causes the rotation of gear 49 to displace tthe accumulator index wheel 50.

Therefore, it is seen by referring to the timing chart shown in Fig. 7 that if during the scanning cycle the characters "9" are matched, the magnet 38 is energized through the "9" segment of the impulse distributor 36 thereby permitting the index wheel to be rotated for the remaining period of the accumulator cycle. An accumulator cycle is equivalent to the scanning cycle for one complete set of characters or in other words, practically one-third of a revolution of the comparing member 10. It is to be understood that an individual controlling magnet 38 is provided for each order of the item entry or accumulating means as indicated in Fig. 5. It is to be noted that on the comparing mask between the groups of similar characters a space is allotted; it is during this timed interval, as shown on the timing chart, that the magnets or control elements are energized. The spaced portions are slotted or provided with openings to permit the photo cells to be illuminated between scanning periods so as to prevent faulty energization of the associated photocell circuits. When translucent characters are used on the record sheet and the photocell circuits are adjusted for operation upon exposure to a maximum of light, the openings between the character groups on the comparing mask are not necessary.

It is understood from the description thus far that upon energization of the magnet 38, indicating that the characters of the record sheet and mask correspond, the controlled device such as described, namely, the item entry means or accumulator, is displaced or operated continuously until the end of the scanning or accumulating cycle, at which time the clutch element 45 is de-clutched by a finger 51 carried on a bar 52. This operation of the accumulator is well known and is explained fully in the cited patent and needs no further description. The usual resetting means for the accumulator is indicated generally at 53 and may be manually operated. Near the end of the machine cycle and upon completion of the scanning and item entry cycle, the control distributor 29, by means of the insulated segment 55, causes the plate circuit described to be opened thereby restoring the discharge tube 26 to a normal inoperative condition and thereby deenergizing the relay 31. The magnet 38 is deenergized, due to the elongated insulated segment on the impulse distributor 36, at the end of the item entry cycle (see Fig. 7). It is to be noted that near the beginning of the machine cycle, the magnet 18 is connected directly across the battery 28 by means of the control distributor 29 and near the end of the cycle is deenergized thereby to operate the said magnet to perform preparatory functions of the machine such as, for example, operating the paper feed device described hereinbefore to present the next line of characters on the record sheet to the sensing position.

From the description thus far it is understood that all of the orders or columns of characters disposed on a line on the record sheet are read simultaneously and the controlled device is operated accordingly. Continuing with the cited example, all the orders of the accumulator are operated and the amounts are entered therein simultaneously in each order to correspond to the characters read on the record sheet. Due to the arrangement of the similar characters of each group in each order, it is seen that even though the characters are misalined or unequally spaced the reading system described is effective to operate the controlled device in accordance with the items or characters disposed on the record sheet.

It should be mentioned at this time that it is preferred to start all the controlling elements of the system in unison, such as the comparing member 10, control distributors 29 and 36 and accumulating or a similarly controlled device; that is, to start the said control elements from a normal starting position, such as the "D" position indicated in Fig. 7.

For this reason, as mentioned hereinbefore, the control elements are actuated by the main driving shaft 23. The sprocket wheel 22 is secured thereto and also the various control distributors 29 and 36. The controlled device, namely, the accumulator, is actuated by the said shaft through the gearing 40 and 41. Referring to Fig. 6, a driving element such as pulley 120 and a clutch operating member 123 integral therewith are rotatably mounted on shaft 23 and continuously rotated by any suitable means through the means such as belt 121. A suitable supporting member 122 for the dog 124, which is pivotally mounted thereon, is fixedly secured to shaft 23. The member 122 and dog 124 have protruding fingers such as indicated by reference character 125 and are adapted to be engaged by the stop 126, which is an extension of armature 128, when the parts are in position as indicated in the figure. When the clutch magnet 127 is energized to attract its armature 128 the stop 126 releases the member 122 and dog 124 so that by means of spring 129, the dog is caused to engage the clutch member 123 which is continuously rotated thereby causing the shaft 23 to be rotated.

With reference to Fig. 5 the machine is started by depressing the start key 130 to close the associated contact 131 connecting the magnet 127 directly across the battery. Energization of the said magnet causes the contacts 132 to be closed to establish a locking circuit for the magnet through the normally closed contacts of the stop key 133, maintaining the magnet energized until the stop key is operated to open the contacts in the locking circuit. Energization of magnet 127 causes the clutch to connect the driving member 123 to the member 122 by dog 124 to rotate the shaft 23. Upon operation of the stop key 133 the magnet is deenergized so as to position the stop 126 in the path of the fingers 125 causing the dog 124 to be disengaged from the clutch member 123, thus causing the controlling elements of the machine to be stopped in the said "D" position.

It is obvious, however, from the present disclosure that instead of reading all the characters in a line simultaneously, a comparing member or mask prepared in accordance with the described principle, instead of having disposed thereon a plurality of orders or columns of characters, could be employed having but a single order or column of characters to read or compare a single character on the record sheet and upon completion of the scanning and operating cycle, read the next adjacent character in the line to control the associated devices and so on. Escapement mechanisms, such as are used in the standard typewriters could be used to present the various characters to the sensing position and the controlling magnet for controlling such operation could be one similar to the magnet 18 and connected as described.

Figure 9:
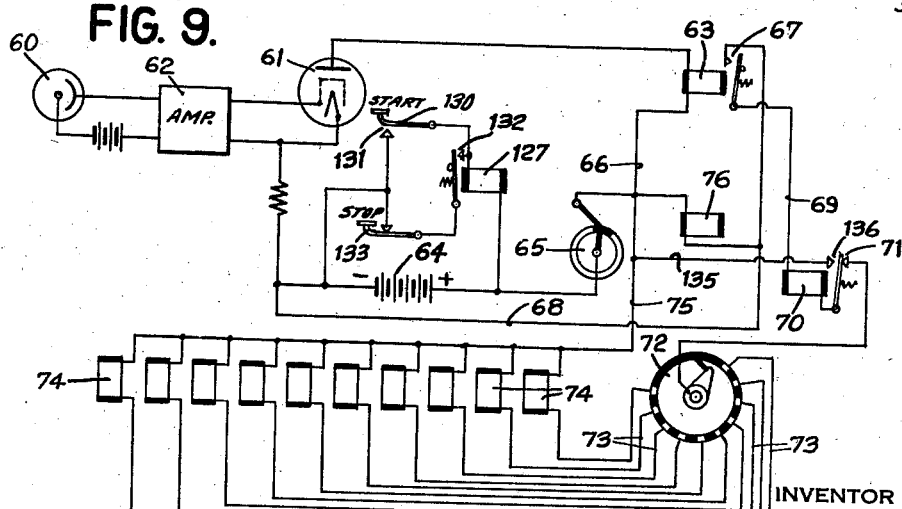
Fig. 9 is a circuit diagram showing still another form of modification of the present invention.

A system reading single characters across a line to control various devices may be used to control typewriters or adding machines or the like, and the following is one method of effecting this feature. Upon correspondence of the character on the record sheet and the particular character on the comparing member in alinement therewith, the photocell 60 (see Fig. 9) is operated to trigger the grid of the discharge tube 61 by means of the amplifier 62 as explained hereinbefore. The flow of current in the plate circuit of the tube causes the relay 63 to be energized due to the circuit established from the positive terminal of battery 64 through control distributor 65 (similar to control distributor 55, Fig. 5), conductor 66, coil of relay 63 and the anode and cathode of tube 61 to the negative side of the battery. Energization of relay 63 causes its associated contacts 67 to be closed permitting current from battery 64 to flow through conductor 68, contacts 67, conductor 69, coil or relay 70, normally closed contact 71 of relay 70, segmented distributor 72 (secured to shaft 23) and one of the conductors 73 through the corresponding control magnet 74, conductor 75 and control distributor 65, energizing the selected magnet 74 thereby operating the associated control mechanism, which, for example, may be the key of a typewriter. The distributor 72 is operated in synchronism with the comparing member and upon matching a character thereof with the character on the record sheet, the distributor brush is in engagement with the segment connected to the associated magnet 74 to correspond to the character read.

The relay 70 is a slow operating relay, the flow of current through its coil as described to operate the magnet 74 does not effect energization of the said relay immediately, but is effective at a timed interval later to energize the relay and open the associated contacts 71 before a false operation of one of the magnets 74 is effected due to the brush of the distributor 72 engaging an adjacent segment. The timing of operation of the relay is adjusted in accordance with the speed of the distributor 72 and the time required for magnet 74 to operate the associated control element. Upon operation of relay 70, a holding circuit is established to maintain the relay energized until the end of the scanning cycle and is as follows: positive side of battery 64, control distributor 65, conductor 135, contact 136, coil of relay 70, conductor 69, contact 67 and conductor 68 to the negative side of the battery.

Near the end of the cycle the control commutator 65 restores the discharge tube 61 and all the associated circuits to the normal condition as shown in the figure. Magnet 76 is also de-energized, similarly as magnet 18 (Fig. 5) and described hereinbefore and can be connected to control the escapement mechanism to present the next character in the line to the sensing position.

In this manner printing of the character read can be effected. It is now evident that the number of characters included in the comparing member can be increased to include additional characters or signs for controlling purposes just as described; that is, alphabetic characters could be included on the comparing member to effect reading of such characters to operate a typewriter or similar device, and also individual and different control characters can be included for various control purposes as seen fit, such as carriage return and tabular operations, for example, when controlling a typewriter or similar device.

With reference now to Fig. 8, another modification of the present invention will be described. Let it be assumed that the characters formed in the lines on the record sheet are allocated properly and in perfect alinement, but that the lines are not in perfect alinement, for example, let it be supposed that the left hand margins of the lines are offset to a certain degree and that it will be necessary to aline each line by the first character thereof before the associated devices can be controlled by the characters on the record sheet accordingly. In the following description, it will be shown how the lines are scanned and how the record sheet or comparing member is positioned in accordance therewith and how after the alinement of the line to be scanned or read is effected the characters are read to control the associated devices. In the example to be set forth, the controlled device will comprise the accumulating device of the statistical machine described hereinbefore, the control circuits for which are similar to the circuit described in Fig. 5 and wherever the circuits and controlling elements are the same as described hereinbefore the same reference numerals are used.

One type of comparing member which may be used to effect the desired result just described is shown in Fig. 4 and designated generally by the reference numeral 80. Several groups of the characters are shown and similarly as described hereinbefore, a plurality of similar characters are provided in each group, the said similar characters, of which there are five in number, are slightly offset from each other. It is to be noted that the offset characters are provided only for the first column. Let it be assumed that the middle character of each individual group denotes the correct position of the characters to be read, therefore, as seen in the figure, this line of characters is extended for each column to be read. If while scanning or reading the first column of characters on the record sheet it is found that the first or second character of the individual group, that is, the characters designated 81—a and 81—b, correspond to the first character of the line, the record sheet is moved in one direction until the character on the record sheet matches and is alined with the middle character of the group, namely, 81—c, and if during the scanning cycle it is found that the character on the record sheet compares with one of the last two characters on the comparing member, namely 81—d and 81—e, the record sheet is moved in the other direction until the character on the record sheet matches with the middle character of the group (81—c). When the line of characters is properly alined all the characters thereof are then read to control the associated and corresponding accumulating devices. It is assumed, of course, that the allocation of the characters in the line on the record sheet correspond to the allocation of the extended middle line of characters on the comparing member, when the character 81—c on the comparing member and the character on the record sheet are aligned and matched. Three complete sets of characters are provided on the comparing member for the reasons set forth and described hereinbefore.

During the various cycles when the first character of each line is sensed and alinement effected, the controlling circuits for the associated and corresponding accumulators are rendered inoperative and upon completion of the alinement of the characters during the following cycle, these controlling circuits are rendered operative to control the accumulators in accordance with the characters read. The described procedure is accomplished in the following manner: As the comparing member or mask 80 is presented to the sensing position 20 the series of characters of the different groups thereof pass over the characters of the record sheet 11 (Fig. 1). All of the photocell circuits except the one corresponding to the character of the first column are maintained inoperative during this sensing cycle due to the open contacts 82 of relay 83. Let it be assumed that the character of the first column of the line sensed on the record sheet is the character "2". It is understood from the description up to this point that if the middle character 81-c on the comparing member 80 and the character on the record sheet match the machine would then be conditioned so that the proper entries would be made into the accumulator during the following cycle; however, let it be assumed that the center character on the comparing member does not match with the character on the record sheet; instead, assume that the first character of the group matches, that is, the character "2" designated 81-a. In order to be able to read all the characters formed in the line on the record sheet, it will now be necessary to position the record sheet so that the said character thereon matches the center character 81-c on the mask.

In Fig. 8, a segmented distributor 84 is shown, the rotatable brush secured to the main drive shaft 23 (Fig. 1) so that one complete revolution thereof is equivalent to a machine cycle as shown in Fig. 7. The segments 85-a to i are engaged by the distributor brush 88 during the timed intervals the first two similar characters of each group of the comparing mask are presented to the sensing position 20 (Fig. 1) such as the characters 81-a and 81-b (Fig. 4). The segments 86-a to i are engaged by the distributor brush when the middle characters of each group of the said mask are presented to the sensing position such as character 81-c (Fig. 4), and the segments 87-a to i are engaged by the brush when the last two characters of each group are presented to the sensing position such as characters 81-d and 81-e.

Continuing with the chosen example, the character 81-a representing the character "2" on the comparing mask matches with the character on the record sheet, the corresponding photocell 12 receives the minimum amount of light and thereby causes the discharge tube 26 to be triggered so that current is permitted to flow in the plate circuit which is as follows: battery 28, conductor 33, cathode and anode of tube 26, conductor 90, brush 88, segment 85-h of distributor 84, common conductor 91, coil of magnet 92, conductor 93 to battery through normally closed contacts 135 of relay 83, thus energizing the magnet 92, thereby causing the ratchet wheel 94 to be rotated a step by means of pawl 95. By means of the differential gearing 96 the arm 97 is positioned a step to the right. The arm 97 is fastened to the record sheet support or carriage by link 98 (Fig. 1) thus causing the record sheet to be moved one step to the right. The step is equivalent to the spacing of the staggered characters on the comparing mask, that is, equal to the distance indicated as 81-f on Fig. 4, so that during the next scanning cycle the character 81-b representing the character "2" matches with the character on the record sheet.

Referring to Fig. 1, for the modification described, the guide plates 15 are slidably mounted in guide supports 140, so that by displacing lever or link 98 the guide plates are displaced accordingly. The guide rolls 16 also may be slidably positioned on the supporting rods 16-a so that the rollers are likewise displaced by means of forked guides 141 which are secured to the guide plates 15. In this manner the record sheet and guide plates may be positioned step by step just as described.

When the brush 88 no longer engages the segment 85-h the discharge tube 26 is restored to the normal inoperative state again due to opening the anode circuit thereof. The magnet 92 again is energized in a similar manner during the following cycle when the characters coincide and brush 88 engages the segment 85-h. The record sheet is now positioned another step to the right so that in this position during the third sensing cycle the middle character 81-c on the comparing mask and the character on the record sheet will be coincident. Therefore, during the third cycle, when the characters are in alinement, the discharge tube 26 is triggered to establish the following circuit: battery 28, cathode and anode of tube 26, conductor 90, brush 88, segment 86-h, conductor 100, normally closed contact 101 of relay 83, coil of relay 102, control distributor 29 to battery, thus energizing relay 102.

The relay 102 is maintained energized by an auxiliary circuit established before the brush 88 is disengaged from the segment 86-h to restore the tube 26 to the normal inoperative condition, as follows: battery 28, conductor 33, contact 104, coil of relay 102 and control distributor 29 to battery. Through the contact 103 a circuit is prepared for relay 83 and magnet 18 and completed by the control distributor 105 during the cycle as follows: battery 28, conductor 33, contact 103, control distributor 105, common conductor 106 to relay 83 and magnet 18 to the battery. Energization of relay 83 closes the control contacts 82, the purpose of which was mentioned hereinbefore, and closes contacts 109 to establish a holding circuit therefor as follows: battery 28, control commutator 107, conductor 108, contacts 109, relay 83, to the battery. Due to the distributor 107 the holding circuit for relay 83 is maintained for the following cycle, so that during the sensing or reading cycle, contacts 82 are maintained closed to permit the discharge tubes 26, which are triggered by the corresponding photocells 12 upon agreement of the characters, to establish a circuit to energize the relays 31 and accumulator control magnets 38 thereby effecting entry in the accumulators to correspond to the characters read on the control sheet. The said control circuits have been described hereinbefore in conjunction with Fig. 5 and need not be repeated here.

Also, upon energization of relay 83 the normally closed contacts 101 and 135 associated therewith are opened to prevent faulty operation of the magnets 92 and 110 during the reading cycle when the controlled device is operated in accordance with the characters sensed. Upon completion of sensing or reading the characters on the record sheet the distributor 107 opens the described holding circuit for relay 83 and magnet 18 and restores the circuits and controlling elements included therein to the normal condition shown in the figure. Deenergization of magnet 18 causes the record sheet to be advanced a line so as to present the following line to the sensing position as described hereinbefore (see Fig. 1). The line thus advanced is then scanned and alined as described so that the characters read during the following cycles can effect control of the associated devices accordingly.

If one of the last two characters 81—d and e of the group would be in alinement with the record sheet character, the magnet 110 would be energized through the conductor 111 and the one of the segments 87—a to i of the distributor 84 to position the record sheet to the left as viewed in the figure by means of the associated ratchet and gearing mechanism to position the arm 97.

In Fig. 10 a section of the scanning or comparing mask is shown connected to the arm 97 which as shown in Fig. 8 is adapted to be positioned as just described. By connecting the arm 97 to the scanning mask 80 instead of the record sheet carriage, the mask can be positioned to effect alinement of the characters as described. When this method of alinement is employed, the conductors 91 and 111 to the magnets 92 and 110 respectively would be reversed since it would be necessary to position the mask in a direction opposite to the record sheet to effect the alinement as set forth hereinabove.

While there has been shown and described and pointed out the fundamental novel features of the invention as applied to several modifications, it will be understood that various omissions and substitutions and changes in the form and details of the devices illustrated and in their operation may be made by those skilled in the art without departing from the spirit of the invention. It is the intention therefore to be limited only as indicated by the scope of the following claims.

What is claimed is as follows:

1. A reading device of the character described controlled by a record sheet bearing various graphical characters, which characters may be irregularly disposed thereon in different positions other than the normal positions where they should appear, comprising means for reading each character formed on the said sheet during a predetermined cycle to determine the true character significance thereof, said reading means including the combination of a comparing member bearing comparing characters for identifying the regularly disposed characters on the sheet, of additional comparing characters formed on the comparing member for identifying the irregularly disposed characters on the sheet, and, of means for rendering the comparing member effective to compare each of the regularly and irregularly disposed characters on the sheet with the comparing characters during the said predetermined cycle thereby determining the true significance of each character to be read upon comparison of like characters; means responsive at different times during the said predetermined cycle upon the comparison of like characters, the said character significance of each character read determining the different times in the cycle at which the comparison of the characters is effected, and means controlled thereby for indicating the compared like characters.

2. A reading device of the character described controlled by a record sheet bearing various graphical characters, which characters may be irregularly disposed thereon in different positions other than the normal positions where they should appear, having means for reading each character formed on the sheet to determine the true character significance thereof, said reading means including the combination of a comparing member bearing comparing characters for identifying the regularly disposed characters on the sheet, of additional comparing characters formed on the comparing member for identifying the irregularly disposed characters on the sheet, of means for projecting, by radiant energy, an image of each character appearing on the sheet upon the comparing member, of means for effecting relative movement between the said image and comparing characters for causing the comparing characters to be brought successively into cooperative relationship with the character image, and, of means sensitive to said radiant energy for determining when correspondence exists between a comparing character and the image of the character projected upon the comparing member.

3. A reading device of the character described controlled by a record sheet bearing various graphical characters, which characters may be irregularly disposed thereon in different positions other than the normal positions where they should appear, having means for reading each character formed on the sheet to determine the true character significance thereof, said reading means including the combination of a comparing member bearing a plurality of differently positioned like characters for each of the characters appearing on the sheet, certain of the said characters formed on the member for identifying the regularly disposed characters on the sheet, and the remaining characters formed on the member for identifying the irregularly disposed characters on the sheet, of means for projecting, by radiant energy, an image of each character appearing on the sheet upon the comparing member, of means for effecting relative movement between the said image and comparing characters for causing the comparing characters to be brought successively into cooperative relationship with the character image, and, of means sensitive to said radiant energy for determining when correspondence exists between a comparing character and the image of the character projected upon the comparing member.

4. A reading device of the character described controlled by a record sheet bearing various graphical characters, having means for reading each character formed on the sheet during a predetermined cycle to determine the true character significance thereof, said reading means including the combination of a comparing member bearing comparing characters for identifying the regularly disposed characters on the sheet, of additional comparing characters for identifying the irregularly disposed characters on the sheet, of means for rendering the comparing member effective for comparing the characters formed on the member with the character to be read during the said predetermined cycle, and, of means for initiating an electrical impulse at different times in the cycle upon the comparison of like characters, the said character significance of each character read determining the different times in the cycle at which the comparison of the characters is effected; an electrostatically controlled gaseous discharge device responsive to said impulse, operating irrespective of the grid potential after being started by said impulse, and means for maintaining the device operative until the end of the said predetermined cycle.

5. A reading device of the character described controlled by a record sheet bearing various graphical characters having means for reading each character formed on the sheet during a predetermined cycle to determine the true character significance thereof, said reading means including the combination of a comparing member bearing comparing characters for identifying the regularly disposed characters on the sheet, of additional comparing characters for identifying the irregularly disposed characters on the sheet, of means for rendering the comparing member effective for comparing the characters formed on the member with the character to be read during the said predetermined cycle, and, of means for initiating an electrical signal at different times in the cycle upon the comparison of like characters, the said character significance of each character read determining the different times at which the comparison of like characters is effected; an electronic discharge device having an input and output circuit, means for impressing the electrical signal upon the input circuit of said discharge device upon the comparison of like characters for effecting a discharge in the output circuit, means for maintaining the said discharge after the discontinuance of the electrical signal, and means for interrupting the discharge of the device at the end of the predetermined cycle.

6. A reading device of the character described controlled by character bearing record sheets comprising means for presenting to the device a record sheet bearing various graphical characters, which characters may be irregularly disposed thereon in different positions other than the normal positions where they should appear, a work circuit, means including light responsive means for examining by light rays the character positions on the sheet; identifying means including means capable of cooperating with the light responsive means by modifying the light rays for determining the true character significance of each of the characters which are regularly disposed on the sheet, and additional means capable of cooperating with the light responsive means by modifying the light rays for determining the true character significance of those characters which are irregularly disposed on the sheet; means for bringing the said identifying means into cooperative relationship with the light responsive means for controlling the latter in accordance with the modified light rays, and means controlled by the light responsive means for influencing the work circuit in a predetermined manner each time the true character significance of each of the regularly and irregularly disposed characters is determined.

7. A reading device of the character described controlled by character bearing record sheets comprising means for presenting to the device a record sheet bearing various graphical characters, which characters may be irregularly disposed thereon in different positions other than the normal positions where they should appear, a work circuit, means including light responsive means for examining by light rays the character positions on the sheet; identifying means including means capable of cooperating with the light responsive means by modifying the light rays for determining the true character significance of each character regularly disposed on the record sheet, and additional means capable of cooperating with the light responsive means by modifying the light rays for determining the true character significance of the characters irregularly disposed on the record sheet; means for bringing the said identifying means into cooperative relationship with the light responsive means for controlling the latter in accordance with the modified light rays, and means controlled by the light responsive means for effecting energization of the said work circuit each time the true character significance of each of the regularly and irregularly disposed characters is determined.

8. A reading device of the character described controlled by character bearing record sheets comprising means for presenting to the device a record sheet bearing various graphical characters, which characters may be irregularly disposed thereon in different positions other than the normal positions where they should appear, means including light responsive means for examining by light rays the character positions on the sheet; identifying means including means capable of cooperating with the light responsive means by modifying the light rays for determining the true character significance of each character regularly disposed on the sheet, and additional means capable of cooperating with the light responsive means by modifying the light rays for determining the true character significance of the characters irregularly disposed on the record sheet; means for bringing the said identifying means into cooperative relationship with the light responsive means for controlling the latter in accordance with the modified light rays, means for registering the different characters appearing on the sheet and control means therefor, and means controlled by the light responsive means for rendering the said control means effective to control the registering means when the true character significance of each of the regularly and irregularly disposed characters is determined thereby registering the characters sensed on the record sheet.

9. A reading device of the character described controlled by character bearing record sheets comprising means for presenting to the device a record sheet bearing various graphical characters, which characters may be irregularly disposed thereon in different positions other than the normal positions where they should appear, a work circuit, means for reading each character formed on the said sheet during a predetermined cycle to determine the true character significance of the character, and means controlled by the reading means for influencing the work circuit at different timed intervals during the predetermined reading cycle, the said character significance of each character read determining the timed interval in the cycle at which the work circuit is influenced, said reading means including the combination of light responsive means, of identifying means having means capable of identifying each of the characters which are regularly disposed on the record sheet and capable of identifying the characters which are irregularly disposed on the record sheet, and of means for causing the said identifying means to cooperate with the light responsive means so that the reading means is effective during the said predetermined cycle to determine the identification of each of the different characters to be read at different predetermined time intervals during the cycle.

10. A reading device of the character described controlled by a record sheet bearing various graphical characters, which characters may be irregularly disposed thereon in different positions other than the normal positions where they should appear, comprising; means for reading each character formed on the said sheet to determine the true character significance thereof, said reading means including the combination of a comparing member bearing comparing characters for identifying the regularly disposed characters on the sheet, of additional comparing characters formed on the comparing member for identifying the irregularly disposed characters on the sheet, and of means for rendering the comparing member effective to compare each of the regularly and irregularly disposed characters on the sheet with the said comparing characters thereby determining the true significance of each character to be read upon comparison of like characters; means for indicating the compared like characters, and means controlled by the reading means for controlling the indicating means upon comparison of the like characters for indicating the said compared like characters.

11. A reading device of the character described controlled by a record sheet having a plurality of lines of various graphical characters, which lines may be irregularly disposed thereon in different positions other than the normal positions where they should appear, comprising a reading station, means for positioning the lines of characters on the sheet successively to the reading station; means capable of reading the characters in each line presented to the station to determine the true character significance of each character to be read, said reading means including the combination of a comparing member bearing comparing characters for identifying the characters in the presented line, of additional comparing characters formed on the comparing member for identifying the first character of a line which is irregularly disposed on the sheet, and of means for effecting comparison of each character on the sheet with the said comparing characters for determining the true significance of each character; means controlled by part of said reading means for effecting relative movement between the record sheet and reading means to properly align the line of characters at the reading station whereby the characters in the line can be read by the reading means, and means for rendering the said reading means effective for reading the characters in the said line upon alignment thereof at the reading station.

JAMES W. BRYCE.